United States Patent
Gong et al.

(10) Patent No.: US 8,457,213 B2
(45) Date of Patent: Jun. 4, 2013

(54) VIDEO SYSTEM AND SCALER

(75) Inventors: Jin-Sheng Gong, Hsinchu (TW); Wei-Lun Weng, Banciao (TW); Yu-Pin Lin, Changjhih Township (TW)

(73) Assignee: Realtek Semiconductor Corp., Hsinchu (TW)

( * ) Notice: Subject to any disclaimer, the term of this patent is extended or adjusted under 35 U.S.C. 154(b) by 596 days.

(21) Appl. No.: 12/470,151

(22) Filed: May 21, 2009

(65) Prior Publication Data
US 2009/0290646 A1     Nov. 26, 2009

(30) Foreign Application Priority Data

May 26, 2008   (TW) .............................. 97119354 A

(51) Int. Cl.
*H04N 7/12*     (2006.01)
(52) U.S. Cl.
USPC .................................................. 375/240.25
(58) Field of Classification Search
None
See application file for complete search history.

(56) References Cited

U.S. PATENT DOCUMENTS

| | | | | |
|---|---|---|---|---|
| 5,583,652 A | * | 12/1996 | Ware | 386/206 |
| 6,477,204 B1 | * | 11/2002 | Fukushima et al. | 375/240.28 |
| 6,950,956 B2 | * | 9/2005 | Zerbe et al. | 713/400 |
| 6,975,362 B2 | * | 12/2005 | Sani et al. | 348/446 |
| 2001/0031017 A1 | * | 10/2001 | Betts | 375/265 |
| 2001/0055336 A1 | * | 12/2001 | Krause et al. | 375/240.11 |
| 2005/0063474 A1 | * | 3/2005 | Choi et al. | 375/240.28 |
| 2005/0238106 A1 | * | 10/2005 | Dumont et al. | 375/240.26 |
| 2006/0120462 A1 | * | 6/2006 | Tsuboi | 375/240.25 |
| 2006/0239393 A1 | * | 10/2006 | Lai et al. | 375/376 |
| 2007/0291856 A1 | * | 12/2007 | Fastert et al. | 375/240.28 |
| 2008/0018793 A1 | * | 1/2008 | Lee et al. | 348/581 |
| 2008/0144726 A1 | * | 6/2008 | Ingber et al. | 375/240.28 |

OTHER PUBLICATIONS

Philips Semiconductor, SAA7118 Multistandard video decoder with adaptive comb filter and component video input, Preliminary Specification, SAA7118, May 30, 2001.*

* cited by examiner

*Primary Examiner* — Jay Patel
*Assistant Examiner* — Jessica Prince
(74) *Attorney, Agent, or Firm* — McClure, Qualey & Rodack, LLP

(57) ABSTRACT

A video system includes a decoder and a scaler. The decoder tracks a video signal, generates a synchronization signal and a frequency offset signal, decodes the video signal, and outputs a decoded signal in accordance with the synchronization signal. The scaler generates a frequency control signal in accordance with the frequency drift signal, generates an output clock signal in accordance with the frequency control signal, generates a scaled signal in accordance with the decoded signal, and outputs a display signal in accordance with the scaled signal and the output clock signal.

25 Claims, 5 Drawing Sheets

VIDEO SYSTEM AND SCALER

CROSS-REFERENCE TO RELATED APPLICATION

This application claims priority of Taiwanese application no. 097119354, filed on May 26, 2008.

BACKGROUND OF THE INVENTION

1. Field of the Invention

This invention relates to a video system and a scaler, more particularly to a video system and a scaler that perform frame synchronization.

2. Description of the Related Art

A video system comprises a decoder and a scaler. The decoder receives a video signal and decodes an image data component of the video signal to generate a decoded signal. The scaler receives the decoded signal, and modifies a frame size (resolution) associated with the decoded signal to generate a display signal output to a display panel.

Since a frequency of the video signal varies, the decoder must utilize a complex tracking mechanism and a complex circuit to track a clock control signal (such as a horizontal synchronization signal (HS), a vertical synchronization signal (VS), or a clock signal (CLOCK)) of the video signal. Similarly, the scaler needs to utilize a complex tracking mechanism (a closed-loop mechanism is conventionally utilized) to track a clock control signal output from the decoder for correctly displaying content of the video signal on the display panel.

FIG. 1(a) illustrates a conventional scaler. The scaler includes a scaling unit 91, an output unit 92, a tracking unit 93, and a clock generating unit 94. The tracking unit 93 receives a clock control signal that is output from the decoder, and generates a frequency control signal in accordance with the clock control signal and an output clock signal that is output from the clock generating unit 94. The clock generating unit 94 generates the output clock signal (including a horizontal synchronization signal (HS) and a clock signal (CLOCK)) in accordance with the frequency control signal. In other words, the output clock signal is fed back to the tracking unit 93 so that the tracking unit 93 and the clock generating unit 94 form a closed-loop circuit. Since the tracking unit 93 must refer to (that is, track) variations in the clock control signal and the output clock signal simultaneously for generating the frequency control signal, it can be inferred that an algorithm utilized by the tracking unit 93 is very complex.

FIG. 1(b) illustrates another conventional scaler. The scaler includes a scaling unit 91', an output unit 92', a tracking unit 93', and a clock generating unit 94'. The tracking unit 93' must track a clock control signal that is output from the decoder and an internal status (a data quantity) of a buffer (not shown) in the scaling unit 91' simultaneously for generating a frequency control signal. The clock generating unit 94' generates an output clock signal (including a horizontal synchronization signal (HS) and a clock signal (CLOCK)) in accordance with the frequency control signal. Since a frequency of the output clock signal directly affects the data quantity of the buffer, which is tracked by the tracking unit 93', the tracking unit 93' and the clock generating unit 94' form a closed-loop circuit similar to that of the previously described conventional scaler of FIG. 1(a).

Although the conventional scalers utilizing a closed-loop mechanism for tracking are capable of displaying correctly the content of the video signal on the display panel, the closed-loop mechanism increases circuit complexity of the video system.

SUMMARY OF THE INVENTION

According to one aspect of the present invention, a video system comprising a decoder and a scaler is provided. The decoder includes a tracking unit and a decoding unit. The tracking unit tracks a video signal to generate a synchronization signal and a frequency offset signal. The decoding unit decodes the video signal and outputs a decoded signal in accordance with the synchronization signal. The scaler includes a frequency control unit, a clock generating unit, a scaling circuit, and an output unit. The frequency control unit receives the frequency offset signal and generates a frequency control signal. The clock generating unit generates an output clock signal in accordance with the frequency control signal. The scaling circuit receives the decoded signal and generates a scaled signal. The output unit receives the scaled signal and the output clock signal and outputs a display signal.

According to another aspect of the present invention, a video system comprising a decoder and a scaler is provided. The decoder includes a tracking unit and a decoding unit. The tracking unit tracks a video signal to generate a synchronization signal. The decoding unit decodes the video signal and outputs a decoded signal in accordance with the synchronization signal. The scaler includes a frequency control unit, a clock generating unit, a scaling circuit, and an output unit. The frequency control unit tracks the synchronization signal and generates a frequency control signal. The clock generating unit generates an output clock signal in accordance with the frequency control signal. The scaling circuit receives the decoded signal and generates a scaled signal. The output unit receives the scaled signal and the output clock signal and outputs a display signal.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1B:
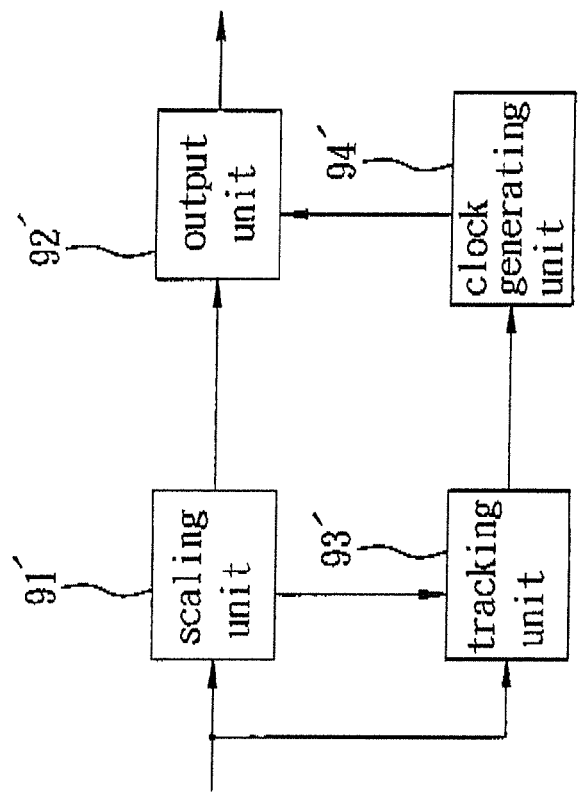
FIGS. 1(a) and 1(b) are schematic circuit block diagrams of two conventional scalers.
Figure 1A:
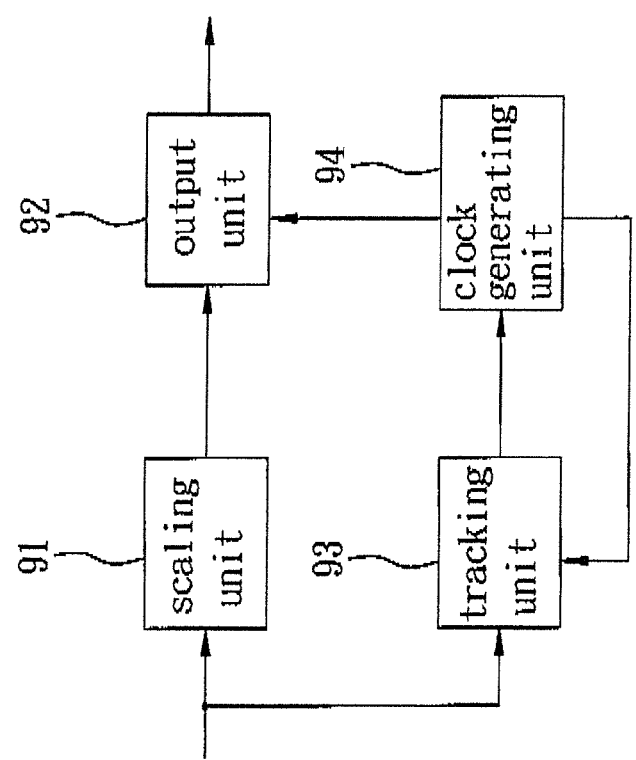
Figure 2:
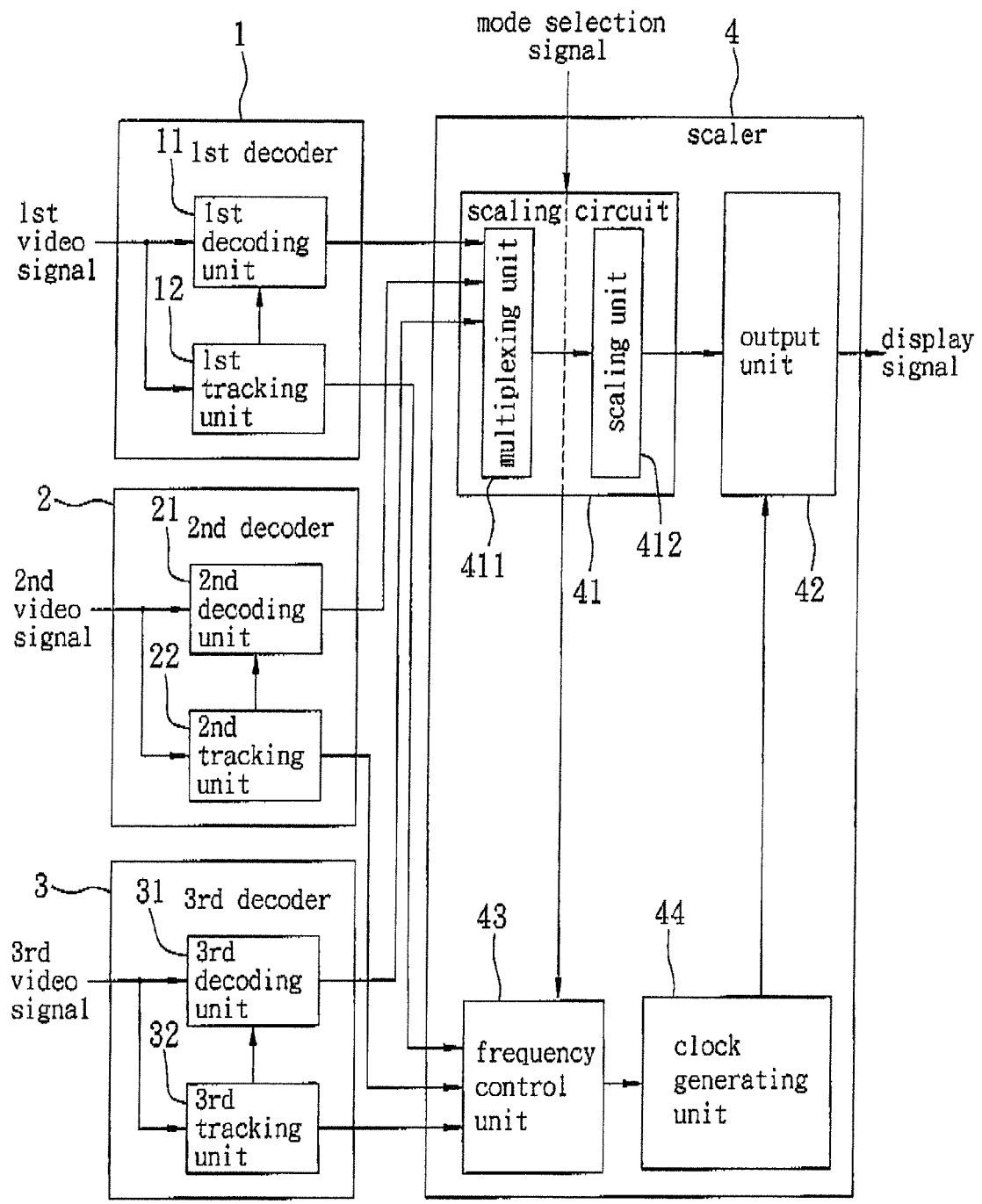
FIG. 2 is a schematic circuit block diagram of a first embodiment of a video system according to the present invention.
Figure 3A:
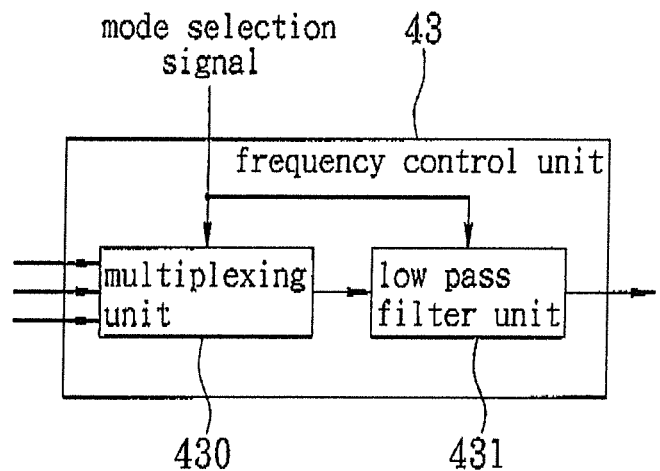
FIGS. 3(a) and 3(b) are respectively schematic circuit block diagrams of a frequency control unit applicable to the first embodiment.
Figure 3B:
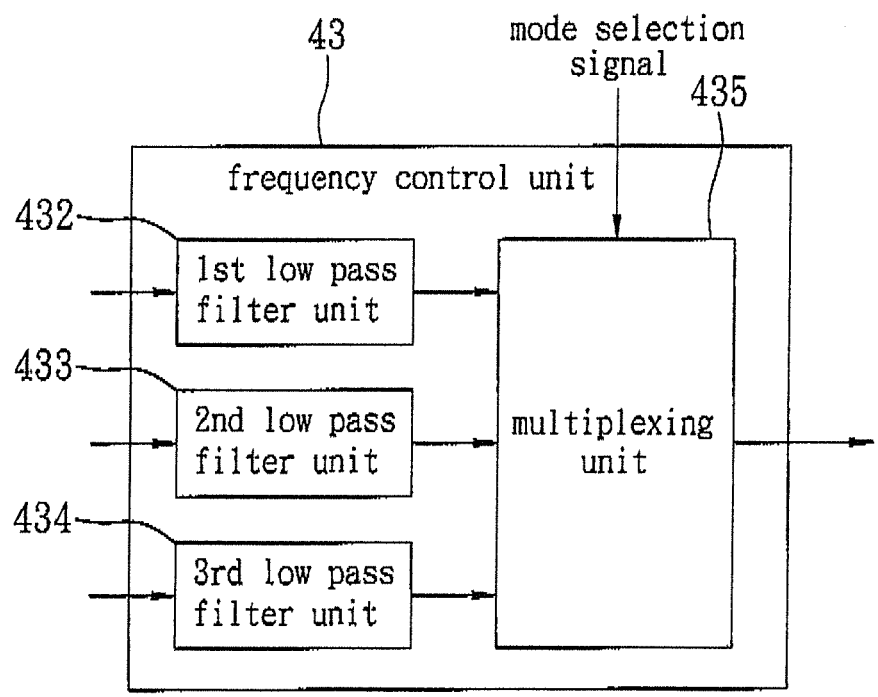

FIGS. 2, 3(a), and 3(b) illustrate the first embodiment of a video system according to the present invention. The video system includes at least one decoder and a scaler 4. In this embodiment, the video system includes a first decoder 1, a second decoder 2, and a third decoder 3.

The first decoder 1 receives a first video signal, and includes a first tracking unit 12 and a first decoding unit 11.

The first tracking unit 12 tracks the first video signal for generating a first synchronization signal and a first frequency offset signal. The first decoding unit 11 decodes the first video signal and outputs a first decoded signal in accordance with the first synchronization signal. In this embodiment, the first video signal is a television video signal and the first decoding unit 11 is a video signal decoder.

The second decoder 2 receives a second video signal, and includes a second tracking unit 22 and a second decoding unit 21. The second tracking unit 22 tracks the second video signal to generate a second synchronization signal and a second frequency offset signal. The second decoding unit 21 decodes the second video signal and outputs a second decoded signal in accordance with the second synchronization signal. In this embodiment, the second video signal is a YPbPr component video signal and the second decoder 21 is a YPbPr component video signal decoder, such as an analog-to-digital converter but not limited thereto.

The third decoder 3 receives a third video signal, and includes a third tracking unit 32 and a third decoding unit 31. The third tracking unit 32 tracks the third video signal for generating a third synchronization signal and a third frequency offset signal. The third decoding unit 31 decodes the third video signal and outputs a third decoded signal in accordance with the third synchronization signal. In this embodiment, the third video signal is a High Definition Multimedia Interface (HDMI) signal and the third decoder 31 is an HDMI decoder.

It is noted that, aside from the above-described video signal decoder, YPbPr component video signal decoder, and HDMI decoder, any of the decoders 1,2,3 can be another commonly known decoder, such as a Video Graphics Array (VGA) decoder or a Transition Minimized Differential Signaling (TMDS) decoder. The manner in which the decoders 1,2,3 are implemented is not limited to what is disclosed herein.

The scaler 4 includes a frequency control unit 43, a clock generating unit 44, a scaling circuit 41, and an output unit 42. The frequency control unit 43 selects one of the first, second, and third frequency offset signals in accordance with a mode selection signal to generate a frequency control signal. The clock generating unit 44 is coupled to the frequency control unit 43 and generates an output clock signal. A frequency of the clock generating unit 44 is adjusted in accordance with the frequency control signal. The scaling circuit 41 includes a multiplexing unit 411 and a scaling unit 412. The multiplexing unit 411 selects one of the first, second, and third decoded signals in accordance with the mode selection signal, and outputs the selected one of the first, second, and third decoded signals to the scaling unit 412. The scaling unit 412 scales the decoded signal output from the multiplexing unit 411 to generate a scaled signal. The output unit 42, coupled to the scaling circuit 412 and the clock generating unit 44, receives the scaled signal and the output clock signal and outputs a display signal to a display panel (not shown).

With further reference to FIG. 3(*a*), in a first configuration, the frequency control unit 43 includes a multiplexing unit 430 and a low pass filter 431. The multiplexing unit 430 selects one of the first, second, and third frequency offset signals in accordance with the mode selection signal, and outputs the selected one of the first, second, and third frequency offset signals to the low pass filter 431. The low pass filter 431 performs low pass filtering on the frequency offset signal output from the multiplexing unit 430 to generate the frequency control signal. It should be noted that filtering parameters of the low pass filter 431 can be fixed in order to reduce circuit complexity. However, to meet performance requirements, it is possible to design an adjustable low pass filter having filtering parameters adjusted in accordance with the mode selection signal.

With further reference to FIG. 3(*b*), in a second configuration, the frequency control unit 43 includes a first low pass filter 432, a second low pass filter 433, a third low pass filter 434, and a multiplexing unit 435. The first, second, and third low pass filter 432,433,434 perform low pass filtering on the first, second, and third frequency offset signals, respectively. The multiplexing unit 435 selects a filtered signal from one of the first, second, and third low pass filter 432,433,434 in accordance with the mode selection signal and outputting the same as the frequency control signal.

It should be noted that, in the above-described two configurations, the frequency control unit 43 utilizes an open-loop mechanism to generate the frequency control signal. However, in other configurations, the frequency control unit 43 may utilize a closed-loop mechanism.

Since the first frequency offset signal indicates a frequency variation of the first synchronization signal, when the clock generating unit 44 adjusts the frequency of the output clock signal in accordance with the frequency control signal generated from the first frequency offset signal, the display signal is thereby controlled to be substantially in sync with the first video signal. In other words, the average input rate of the first video signal is approximate to or equivalent to the average output rate of the display signal. Likewise, through the second and third frequency offset signals, the second and third display signals are controlled to be substantially in sync with the second and third video signals, respectively. Since the frequency control unit 43 does not need to track frequency variation of the first, second, and third synchronization signals, circuit complexity is reduced.

Figure 4:
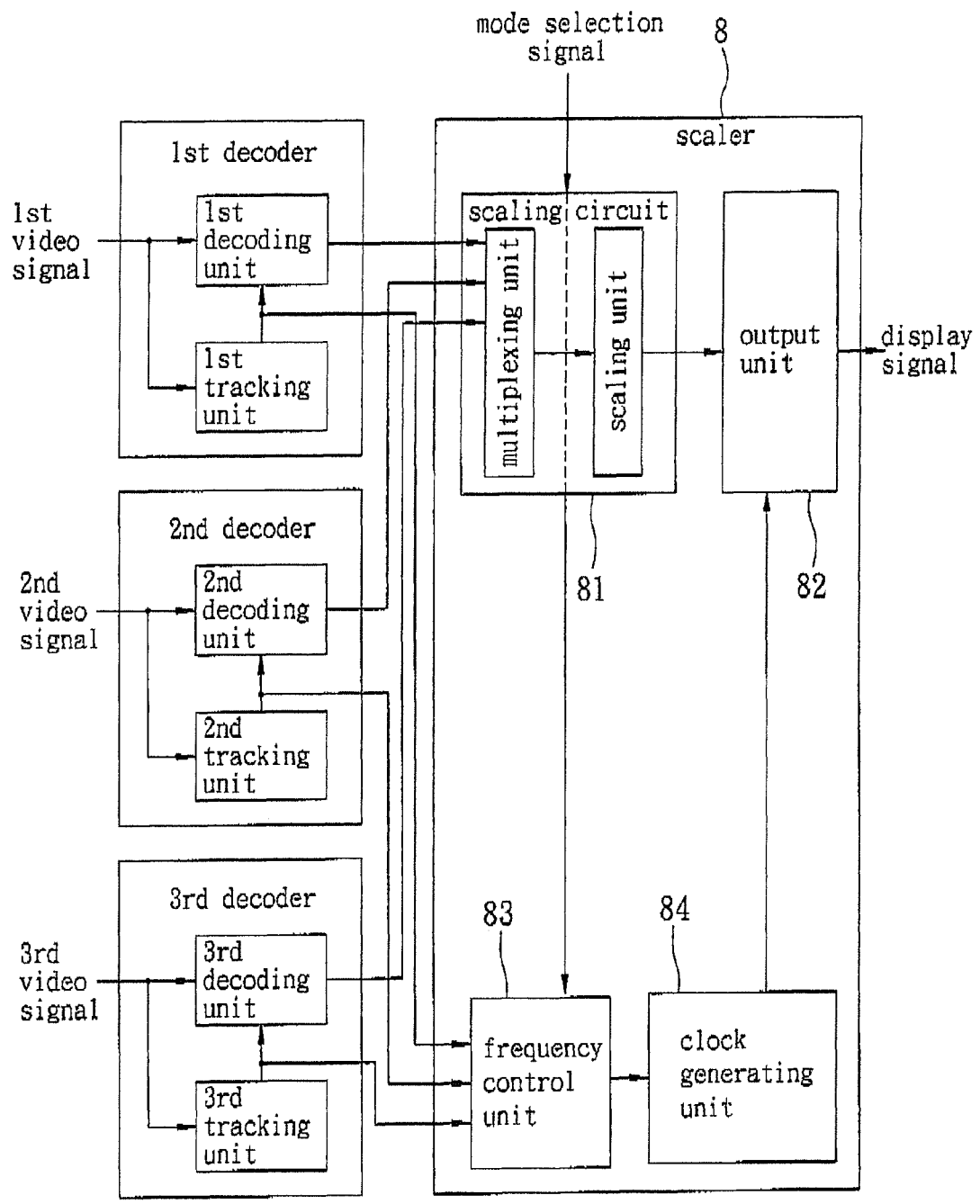
FIG. 4 is a schematic circuit block diagram of a second embodiment of a video system according to the present invention.
Figure 5:
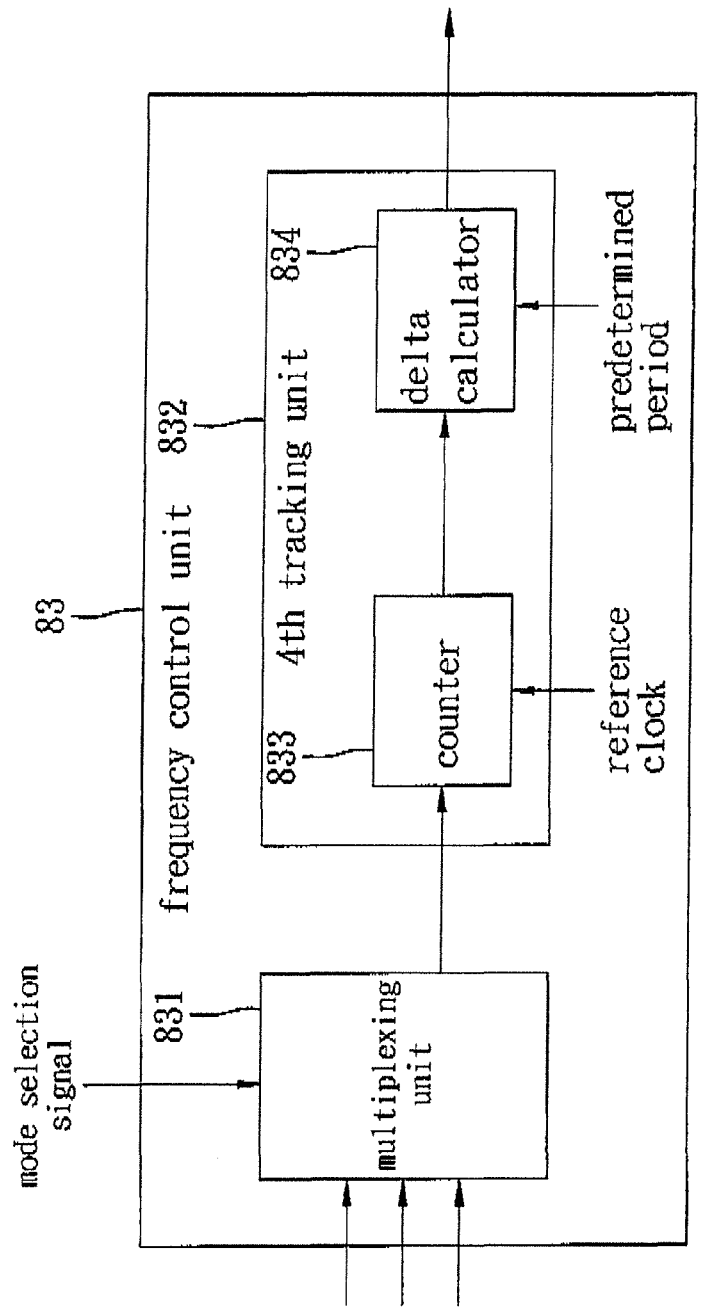
FIG. 5 is a schematic circuit block diagram of a frequency control unit of the second embodiment.

FIGS. 4 and 5 illustrate the second embodiment of a video system according to the present invention. The video system includes at least one decoder and a scaler 8. The second embodiment differs from the first embodiment in that the frequency control unit 83 receives the first, second, and third synchronization signals instead of the first, second, and third frequency offset signals. The frequency control unit 83 selects one of the first, second, and third synchronization signals in accordance with the mode selection signal, and tracks the selected one of the first, second, and third synchronization signals to generate the frequency control signal. The clock generating unit 84 generates the output clock signal in accordance with the frequency control signal, and outputs the output clock signal.

In this embodiment, the frequency control unit 83 includes a multiplexing unit 831 and a fourth tracking unit 832, as shown in FIG. 5. The multiplexing unit 831 selects one of the first, second, and third synchronization signals in accordance with the mode selection signal, and outputs the selected one of the first, second, and third synchronization signals to the fourth tracking unit 832. The fourth tracking unit 832 tracks the synchronization signal output from the multiplexing unit 831 to generate the frequency control signal. The fourth tracking unit 832 includes a counter 833 and a delta calculator 834. The counter 833 counts a period of the synchronization signal output from the multiplexing unit 831 in accordance with a reference clock and generates a count value. The delta calculator 834 calculates the frequency control signal according to the count value and ap redetermined (standard) period.

In this embodiment, the frequency control unit 83 and the clock generating unit 84 do not form a closed-loop circuit, and the frequency control unit 83, the clock generating unit 84, the scaling circuit 81 and the output unit 82 together do not form a closed-loop circuit. In other words, this embodiment utilizes an open-loop mechanism. Therefore, circuit complexity of the frequency control unit 83 is significantly reduced compared to the tracking units 93,93' disclosed in the prior art, which utilize closed-loop mechanisms.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A video system comprising:
    a first decoder including
        a first tracking unit, tracking a first video signal to generate a first synchronization signal and a first frequency offset signal, and
        a first decoding unit, decoding the first video signal and outputting a first decoded signal in accordance with the first synchronization signal; and
    a scaler including
        a frequency control unit, receiving the first frequency offset signal and generating a frequency control signal,
        a clock generating unit, generating an output clock signal in accordance with the frequency control signal,
        a scaling circuit, receiving the first decoded signal and generating a scaled signal, and
        an output unit, receiving the scaled signal and the output clock signal and outputting a display signal.

2. The video system as claimed in claim 1, wherein the first frequency offset signal indicates a frequency variation of the first synchronization signal.

3. The video system as claimed in claim 1, wherein the frequency control unit includes a low pass filter.

4. The video system as claimed in claim 1, further comprising:
    a second decoder, generating a second decoded signal, a second synchronization signal, and a second frequency offset signal in accordance with a second video signal;
    wherein the frequency control unit selects one of the first and second frequency offset signals in accordance with a mode selection signal to generate the frequency control signal; and
    wherein the scaling circuit selects one of the first and second decoded signals in accordance with the mode selection signal and scales the selected one of the first and second decoded signals to generate the scaled signal.

5. The video system as claimed in claim 4, wherein the frequency control unit includes a multiplexing unit for selecting the one of the first and second frequency offset signals, and a low pass filter filtering the selected one of the first and second frequency offset signals.

6. The video system as claimed in claim 5, wherein filtering parameters of the low pass filter are fixed.

7. The video system as claimed in claim 5, wherein the low pass filter is an adjustable low pass filter having filtering parameters adjusted according to the mode selection signal.

8. The video system as claimed in claim 4, wherein the scaling circuit includes a multiplexing unit selecting one of the first and second decoded signals, and a scaling unit scaling the selected one of the first and second decoded signals.

9. The video system as claimed in claim 4, wherein the first decoder is a component video signal decoder, and the second decoder is a High Definition Multimedia Interface decoder.

10. The video system as claimed in claim 1, wherein the frequency control unit utilizes an open-loop mechanism to generate the frequency control signal.

11. The video system as claimed in claim 1, wherein the frequency control unit includes a first multiplexing unit, and the scaling circuit includes a second multiplexing unit and a scaling unit, the first and second multiplexing units being simultaneously controlled through a mode selection signal.

12. A scaler comprising:
    a frequency control unit, receiving a frequency offset signal and generating a frequency control signal;
    a clock generating unit coupled to the frequency control unit and generating an output clock signal in accordance with the frequency control signal;
    a scaling circuit, receiving a decoded signal and generating a scaled signal; and
    an output unit, coupled to the clock generating unit and the scaling circuit, receiving the scaled signal and the output clock signal and outputting a display signal.

13. The scaler as claimed in claim 12, wherein the frequency offset signal indicates a frequency variation of a synchronization signal corresponding to the decoded signal.

14. The scaler as claimed in claim 12, wherein the frequency control unit includes a low pass filter.

15. The scaler as claimed in claim 12, wherein the frequency control unit includes an adjustable low pass filter having filtering parameters adjusted in accordance with a mode selection signal.

16. The scaler as claimed in claim 12, wherein the frequency control unit includes a first multiplexing unit, and the scaling circuit includes a second multiplexing unit and a scaling unit, the first and second multiplexing units being simultaneously controlled through a mode selection signal.

17. The scaler as claimed in claim 12, wherein the frequency control unit utilizes an open-loop mechanism to generate the frequency control signal.

18. A video system comprising:
    a first decoder including
        a first tracking unit, tracking a first video signal to generate a first synchronization signal, and
        a first decoding unit, decoding the first video signal and outputting a first decoded signal in accordance with the first synchronization signal; and
    a scaler including
        a frequency control unit, receiving the first synchronization signal and generating a frequency control signal,
        a clock generating unit, generating an output clock signal in accordance with the frequency control signal,
        a scaling circuit, receiving the first decoded signal and generating a scaled signal, and
        an output unit, receiving the scaled signal and the output clock signal and outputting a display signal.

19. The video system as claimed in claim 18, wherein the frequency control unit includes:
    a counter, counting the first synchronization signal in accordance with a reference clock to generate a count value; and
    a delta calculator, calculating the frequency control signal according to the count value and a predetermined period.

20. The video system as claimed in claim 18, further comprising:
    a second decoder, generating a second decoded signal and a second synchronization signal in accordance with a second video signal;
    wherein the frequency control unit selects one of the first and second synchronization signals in accordance with a mode selection signal, and tracks the selected one of the first and second synchronization signals to generate the frequency control signal; and wherein the scaling circuit selects one of the first and second decoded signals in accordance with the mode selection signal, and scales the selected one of the first and second decoded signals to generate the scaled signal.

21. The video system as claimed in claim 18, wherein the frequency control unit includes a first multiplexing unit, and the scaling circuit includes a second multiplexing unit and a scaling unit, the first and second multiplexing units being simultaneously controlled through a mode selection signal.

22. The video system as claimed in claim 20, wherein the first decoder is a component video signal decoder, and the second decoder is a High Definition Multimedia Interface decoder.

23. A scaler comprising:
a frequency control unit, receiving a synchronization signal corresponding to a decoded signal and generating a frequency control signal;
a clock generating unit, coupled to the frequency control unit and outputting an output clock signal in accordance with the frequency control signal;
a scaling circuit, receiving the decoded signal and generating a scaled signal; and
an output unit, coupled to the clock generating unit and the scaling circuit, receiving the scaled signal and the output clock signal and outputting a display signal.

24. The scaler as claimed in claim 23, wherein the frequency control unit includes:
a counter, counting the synchronization signal in accordance with a reference clock to generate a count value; and
a delta calculator, calculating the frequency control signal according to the count value and a predetermined period.

25. The scaler as claimed in claim 23, wherein the frequency control unit includes a first multiplexing unit, and the scaling circuit includes a second multiplexing unit and a scaling unit, the first and second multiplexing units being simultaneously controlled through a mode selection signal.

* * * * *